April 23, 1957   N. BURNETT   2,790,059
RESISTANCE SOLDERING DEVICE AND METHOD
Filed June 13, 1955

INVENTOR
NATHAN BURNETT
BY
Mason & Graham
ATTORNEYS

United States Patent Office 2,790,059
Patented Apr. 23, 1957

2,790,059

RESISTANCE SOLDERING DEVICE AND METHOD

Nathan Burnett, Los Angeles, Calif., assignor to Zepher Manufacturing Co., Inglewood, Calif., a copartnership Application June 13, 1955, Serial No. 514,971

1 Claim. (Cl. 219—26)

This invention has to do with methods of and devices for resistance soldering.

In the soldering art considerable difficulty has been experienced in soldering together objects in restricted spaces, such as in the soldering of electrical wires to terminals in complicated electrical circuits utilizing a large number of closely spaced small wire-receiving terminals. Frequently such terminals are of the order of $\frac{1}{32}''$ in diameter and are frequently spaced apart about $\frac{1}{16}$ of an inch. It is extremely difficult to get a conduction soldering iron into such small places.

There are many requisites to proper and dependable soldering, particularly in aircraft electrical circuits. Among those requisites are; all the areas to be joined should be heated to or above the flow of the solder; the application of heat should be so controlled as to prevent damage to components of the assembly, such as the charring of insulating material and the embrittlement of wires; the parts to be joined should be held together in such manner that they do not move relatively during the soldering operation; after the joint has cooled it should be free of flux residue; the wires to be soldered into a terminal should be sweated into the terminal without the use of more solder than is necessary to fill the space around the wire; and solder should not be allowed to flow onto a surface which is not properly heated. The difficulties in complying with those requisites of proper soldering can be appreciated when it is realized that over 50% of all rejections in electrical wiring is because of defective soldering.

Because of the necessary size of conduction soldering irons they have not been generally usable for soldering in such close spaces and they have been undependable where careful control of the heat is required. In an attempt to overcome the disadvantages of conduction soldering, resistance soldering has been proposed, wherein relatively small conductive probes have been used to contact the terminal or part to which a wire or other object is to be joined, so that the terminal or part provides a resistance which generates sufficient heat to melt the solder.

However, those resistance soldering devices of which I am aware, have possessed the serious shortcoming that the probes must be manually held against the terminal or part throughout the soldering operation, thus occupying one of the operator's hands and only allowing the use of the other hand for the purpose of manipulating the solder and the wire or part to be joined to the terminal or other part. Also, in those prior resistance soldering devices of which I am aware, the control of the electrical current has been merely by a foot-actuated control switch which operates to close the circuit to the probe so long as the foot is kept on the switch. It has been found most impossible for a worker to manually operate said foot switch in a manner to produce pulses of uniform duration and oftentimes so much heat is applied that it not only embrittles the wire and chars the insulation but also heats the relatively small probes to a red heat causing them to become deformed.

It is among the objects of my invention to provide a resistance soldering device and a method which completely overcome the above-mentioned disadvantages and shortcomings and which not only provide meticulous control and uniform application of the heat but also leaves both hands of the operator entirely free so that he may use one hand to manipulate the wire or other part to be joined and he can use the other hand to manipulate the solder.

In general, I attained those objects by providing a resistance soldering device and method wherein the probe elements are resilient and relatively adjustable towards and away from each other and are arranged to resiliently, firmly grip opposite surfaces of the terminal or part to which a wire or other part is to be joined; and wherein heat is applied by a relatively high current during a relatively short pulse of predetermined duration.

Still further objects and advantages will appear from the following description of an embodiment of my invention, for which purposes I shall refer to the accompanying drawings wherein.

Figure 1:
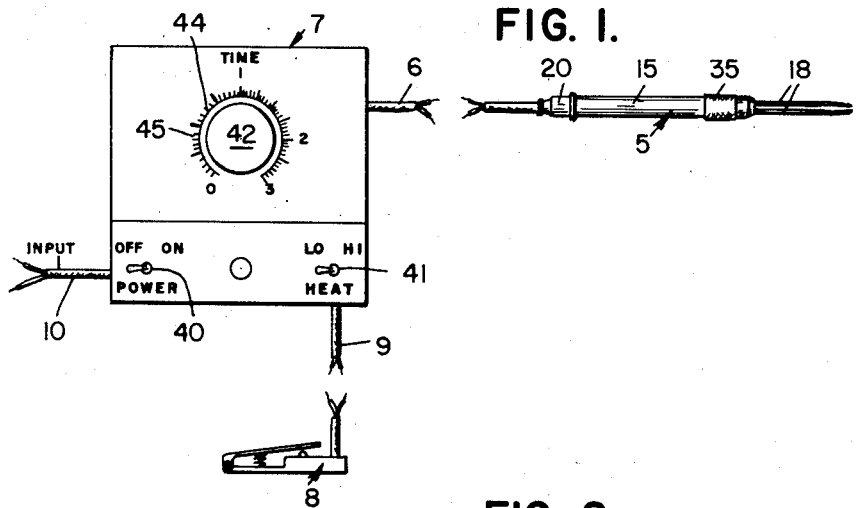
Fig. 1 is an elevational view.
Figure 2:
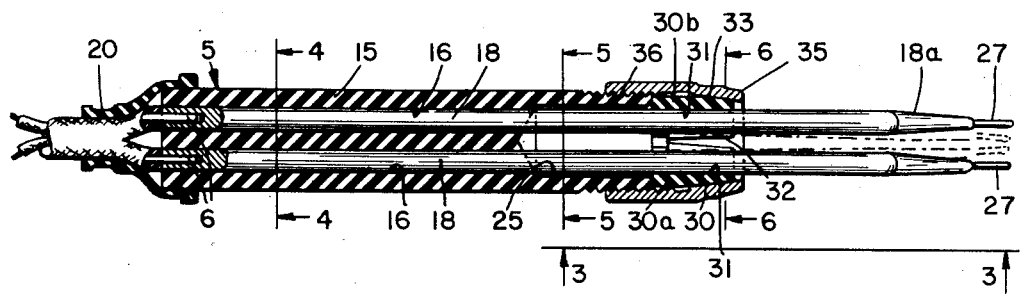
Fig. 2 is an enlarged longitudinal section of the soldering or probe device.
Figure 4:
Figure 5:
Figure 3:
Fig. 3 is a side elevation taken on line 3—3 of Fig. 2.
Figure 6:
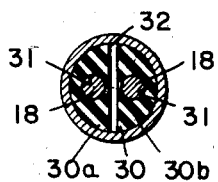
Figure 7:
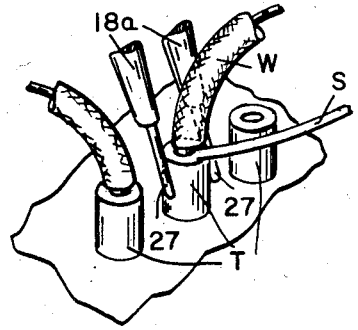

Figs. 4, 5, and 6 are, respectively, sections taken on lines 4—4, 5—5, and 6—6 of Fig. 2; and Fig. 7 is a perspective view illustrating a soldering operation.

The general construction shown in the drawings may be considered as preferred, and while that construction will be rather specifically described, it is to be understood that variations may be made within the scope of the invention as claimed.

Referring now to the drawing, the numeral 5 denotes my heating or probe device, which is connected in circuit, by wires 6, with a conventional electrical timing control device 7 operated by a foot control switch 8 connected to the control device by wiring 9. The electrical input wires are denoted by the numeral 10.

The probe 5, best illustrated in Figs. 2-6 inclusive, comprises a nonconductive body 15, made of rubber, plastic or other suitable nonconductive material, having two diametrically spaced longitudinal bores 16 in which are force-fitted a pair of electrically conductive rods 18 whose inner ends are bored to receive electrical wires 6. Preferably a soft rubber protective ferrule 20 is fitted over the inner end of the body.

The outer end of the body is counterbored at 25 to provide a space between the outer end portions of rods 18 to facilitate their being flexed together. The rods 18 are preferably made of bronze although other suitable conductive materials may be used and they should possess some resiliency.

The outer ends of the rods 18 are somewhat tapered and, in one preferred form of my device, are bent at an angle and each has an axial bore 26 in its outer end to receive a tip 27, which may be composed of various alloys. For what I call my smaller tips (those of the order of $\frac{1}{16}''$ in diameter), I prefer to use stainless steel, while for larger tips I prefer to use an alloy of tungsten, cobalt, chromium and tantalum. The tips should themselves afford just enough resistance to produce in the tips enough heat to insure that the heating of the terminal will be started from the diametrically opposite sides of the terminal contacted by the tips. The resistance of the tips should not be sufficient to cause them to glow or color by the passage of the current therethrough. The heat should be created between the low resistance tips in the mass of the terminal itself by the passage of high current at low voltage.

The tips should also be somewhat resilient. A resilient rubber plug 30 has bores 31 through which the rods 18 extend and is provided with an outwardly flaring wedge-shaped slot 32, dividing the outer end of the plug into normally spaced opposed portions 30a, 30b. The inner end of the plug abuts the outer end of the body and the periphery of the plug tapers towards its outer end, as shown at 33.

To secure the plug against the outer end of the body and to cam together the portions 30a, 30b of the plug for the purpose of varying their spacing, I provide a collar 35 threaded onto the outer end of the body at 36. The collar has an oppositely tapered outer end portion which functions to cam the opposite portions 30a, 30b of the plug towards each other when the collar is screwed onto the body, and to release said portions 30a, 30b when screwed in the opposite direction so that the outer ends of the rods may flex away from each other. In this manner the spacing of the tips may be varied at the will of the operator.

The timing control device 7 may be of conventional construction and is shown as having a manually operable switch 40 for opening and closing the supply circuit, a manually operable switch 41 for providing either a relatively high or a relatively low voltage, and a manually operable knob control member 42 for setting the duration of the desired pulse, the timing being visually denoted by means of a pointer 44 in cooperation with a dial 45. The circuit is closed by placing the operator's foot on the conventional foot control switch 8, which closes a circuit to the device 5, and, after the predetermined pulse has been supplied, the circuit is automatically opened by the control device. Any conventional means may be provided for automatically opening the circuit to the device 5, such as a thyratron-operated relay controlling the circuit wherein the closing of the switch 8 serves to permit a resistance network to leak the charge held by a capacitor therein to reduce negative bias on the grid of the tube allowing the tube to conduct and energize the relay.

In operation, the control device is first set to deliver the desired current for the desired predetermined pulse period and the operator then forces the tips 27 over diametrically opposite sides of the terminal T (Fig. 7) by springing them apart. The resiliency of the rods 18, tips 27, and plug 30 enables the tips to resiliently grip the terminal with sufficient tenacity to hold the probe in place without use of the hands. Thus the operator is free to hold the wire W in one hand and the solder S in the other hand. The operator inserts the end of the solder strip S into the terminal and trips the foot switch 8, thus delivering a momentary electrical pulse of predetermined duration sufficient to heat the entire terminal to or above the melting point of the solder and to melt the solder. For a small terminal having an internal diameter of about 1/32", this pulse may be of the order of 15 amperes, at 2½ volts for a period of ¾ of a second. While this is typical, it is not critical. As previously pointed out, the tips of the device should be of a relatively low resistance material so that they will not overheat, the purpose being that the heat should be created in the mass of the terminal itself by the passage therethrough of more current than what the terminal can normally conduct without dissipating the current in the form of heat. Thus, raising the temperature of the terminal by heat conduction from the tips to the terminal should be secondary. After the control device functions to open the circuit, the operator then inserts the end of the wire into the terminal and repeats the operation of the foot switch 8. Since the terminal is internally heated by virtue of its resistance, any flux residue in the terminal will be driven out.

From the foregoing, it will be apparent that not only do my device and method enable the operator to free both hands and to meticulously and uniformly control the soldering pulse, but the device may be easily adjusted to different-sized objects and provides a firm and uniform stationary contact with the part to be heated.

I claim:

In the art of resistance soldering, a device for heating an article to be soldered comprising, in combination, an electrically nonconductive body having diametrically opposed, normally spaced resiliently flexible outer end portions, a pair of electrically conductive rods extending longitudinally of said body in spaced relationship, the outer end portion of one of said rods extending through and projecting from one of said outer end portions of said body and the outer end portion of the other of said rods extending through and projecting from the other of said outer end portions of said body, said rods having resiliently flexible outer end portions and terminating in tip portions for contacting and resiliently clamping said article therebetween, and a tapered collar threadedly carried by said body and embracing said opposed outer end portions of said body whereby to cam them towards each other in response to rotation of said collar relative to said body.

References Cited in the file of this patent

UNITED STATES PATENTS

| | | |
|---|---|---|
| 1,037,030 | Lux | Aug. 27, 1912 |
| 2,283,158 | Humphrey | May 12, 1942 |
| 2,363,714 | Welch | Nov. 28, 1944 |
| 2,449,521 | Warner | Sept. 14, 1948 |
| 2,636,971 | Delbrook | Apr. 28, 1953 |

FOREIGN PATENTS

| | | |
|---|---|---|
| 556,835 | Great Britain | Oct. 25, 1943 |
| 665,317 | Great Britain | Jan. 23, 1952 |
| 1,083,573 | France | June 30, 1954 |